United States Patent Office 3,088,942
Patented May 7, 1963

3,088,942
MONOSUBSTITUTED ALUMINUM DIHALIDE CATALYSTS FOR OLEFIN POLYMERIZATION
Harry W. Coover, Jr., Kingsport, Tenn., assignor to Eastman Kodak Company, Rochester, N.Y., a corporation of New Jersey
No Drawing. Filed Mar. 31, 1958, Ser. No. 724,911
14 Claims. (Cl. 260—93.7)

This invention relates to a new and improved polymerization process and is particularly concerned with the use of a novel catalyst combination for preparing high molecular weight solid polyolefins, such as polypropylene, of high density and crystallinity. In a particular aspect the invention is concerned with the preparation of polypropylene and higher polyolefins having a high density using a particular catalyst combination which has unexpected catalytic activity and which gives products characterized by unusually high crystallinity, softening point, thermal stability, stiffness and being substantially free of non-crystalline polymers.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

Certain of the trialkyl aluminum compounds have been used in conjunction with inorganic halides to give high molecular weight polyethylene. Thus, triethyl aluminum in conjunction with titanium tetrachloride permits a low temperature, low pressure polymerization of ethylene to highly crystalline product. When this same aluminum triethyl is used in conjunction with a titanium tetraalkoxide, such as titanium tetrabutoxide, the mixture does not produce solid polyethylene for some reason which is not apparent. A mixture of an alkyl aluminum dihalide and a titanium tetraalkoxide can be used to polymerize ethylene to form high density crystalline polymers, but when this catalyst is used to polymerize propylene and higher monoolefins high yields of polymeric oils and rubber are produced.

When a solid polyolefin of high density and high crystallinity is desired, a catalyst mixture that produces large quantities of oils and rubber is undesirable and in some instances commercially inadequate.

This invention is concerned with and has for an object the provision of improved processes whereby α-monoolefins and particularly propylene can be readily polymerized by catalytic means to give high molecular weight, highly crystalline polymers. A particular object of the invention is to provide an improved catalyst combination which has unexpected catalytic activity for the polymerization of α-monoolefins to form crystalline high density polymers. Other objects will be apparent from the description and claims which follow.

This invention is a continuation-in-part of my copending application, Serial No. 549,860 filed November 29, 1955, now U.S. Patent No. 2,833,755.

The above and other objects are attained by means of this invention, wherein α-monoolefins, either singly or in admixture, are readily polymerized to high molecular weight solid polymers by effecting the polymerization in the presence of a catalytic mixture containing an aluminum dihalide having the formula $R_1AlX_2$ wherein $R_1$ is selected from the group consisting of lower alkyl radicals containing from 1 to 12 carbon atoms, phenyl and benzyl and the halogen atoms are selected from the group consisting of chlorine, bromine and iodine, and alkoxide of a transition metal selected from the group consisting of titanium, zirconium, vanadium, chromium and molybdenum, and a third component selected form the compounds having the formulas:

$P(O)Y_3$, $PY_3$, $RC(O)Y$, and $YC(O)(CH_2)_nC(O)Y$ wherein each Y is an alkylamino ($-NR_2$) or alkoxy ($-OR$), said R being an alkyl radical containing 1 to 8, preferably 1 to 4 carbon atoms, and wherein $n$ is an integer of 1 to 4. The catalytic activity of this mixture was wholly unexpected, particularly since the monoalkyl aluminum dihalides when used alone are ineffective as polymerization catalyst and when combined with certain metal alkoxides produce large amounts of oils and rubbers in polymerizing propylene and higher monoolefins. The inventive process is carried out in liquid phase in an inert organic liquid and preferably an inert liquid hydrocarbon vehicle. The process proceeds with excellent results over a temperature range of from 0° C. to 250° C. although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves both as a liquid reaction medium and as a solvent for the solid polymerization products at the temperature of polymerization.

The invention is of particular importance in the preparation of highly crystalline polypropylene, the polybutenes and polystyrene, although it can be used for polymerizing ethylene, mixtures of ethylene and propylene as well as other α-monoolefins containing up to 10 carbon atoms. The polyethylene which is obtained in accordance with this invention has a softening or fusion point greater than 120° C. whereby the products prepared therefrom can be readily employed in contact with boiling water without deformation or other deleterious effects. The process of the invention readily results in solid polymers having molecular weights greater than 1000 and usually greater than 10,000. Furthermore, polymers having molecular weights of as much as 1,000,000 or higher can be readily prepared if desired. The high molecular weight, high density polyethylenes of this invention are insoluble in solvents at ordinary temperatures but they are partially soluble in such solvents as xylene, toluene or tetralin at temperatures above 100° C. These solubility characteristics make it possible to carry out the polymerization process under conditions wherein the polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosity as measured in tetralin at 145° C. can be varied from about 0.5 or lower to 5.0 or higher. Melt indices as measured by the standard A.S.T.M. method may be varied from about 0.1 to 100 or even higher.

The novel catalysts described above are particularly useful for polymerizing propylene to form a crystalline, high-density polymer. The polypropylene produced has a softening point above 155° C. and a density of 0.91 and higher. Usually the density of the polypropylene is of the order of 0.91 to 0.92.

The polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

As has been indicated above the improved results obtained in accordance with this invention depend upon the particular catalyst combination. Thus, one of the components of the catalyst is an aluminum dihalide having the formula $R_1AlX_2$ wherein $R_1$ is a hydrocarbon radical containing 1–12 carbon atoms and selected from the group consisting of alkyl, aryl, and aralkyl. Among these hydrocarbon radicals are methyl, ethyl, propyl, butyl, phenyl, phenylethyl, naphthyl, and X is a halogen selected from the group consisting of chlorine, bromine and iodine. The preferred alkyl aluminum dihalides are the lower alkyl derivatives, and the most preferred is ethyl aluminum dichloride. Another component of the catalyst composition is an alkoxide of a transition metal selected from the group consisting of titanium, zirconium, vanadium, chromium and molybdenum. In these compounds the transition metal is preferably at its maximum valence, but a compound of a transition metal having a reduced valence can be used. For most desirable results it is preferred to use an alkoxide of titanium, for example, titanium ethoxide and titanium butoxide, and the titanium tetraalkoxides are usually used. It will be understood that the alkoxides of the other transition metals can be used if desired. The third component of the catalyst composition is a compound having the formula

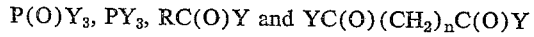
$P(O)Y_3$, $PY_3$, $RC(O)Y$ and $YC(O)(CH_2)_nC(O)Y$

Each Y represents a lower alkylamino or lower alkoxy radical, R is a lower alkyl radical containing 1 to 8 carbon atoms and $n$ is an integer of 1 to 4.

Among the specific compounds that can be used are tris-N,N-dimethyl phosphoramide, triethyl phosphate, mixed phosphate ester-amides, triethyl phosphite, N,N-dimethylacetamide, adipamide and the like. The catalyst compositions of this invention when reacted with water do not produce hydrogen.

The limiting factor in the temperature of the process appears to be the decomposition temperature of the catalyst. Ordinarily temperatures from 50° C. to 150° C. are employed, although temperatures as low as 0° C. or as high as 250° C. can be employed if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations above 5–10% by weight in a solution process are ordinarily less desirable because the polymer dissolved in the reaction medium results in a very viscous solution.

The molar ratio of aluminum dihalide to transition metal compound can be varied within the range of 1:0.5 to 1:2, and the molar ratio of aluminum compound to the third component of the catalytic mixture can be varied within the range of 1:1 to 1:0.25. A particularly effective catalyst contains one mole of transistion metal compound and 0.5 mole of the third component per mole of aluminum compound, but it will be understood that higher and lower molar ratios are within the scope of invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalene, n-pentane, n-octane, isooctane, methyl cyclohexane, tetralin, decalin, and any of the other well-known inert liquid hydrocarbons. The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with polymerizable α-monoolefin.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

A particularly effective catalyst for polymerizing ethylene, propylene, styrene and other α-monoolefins in accordance with this invention is a mixture of ethyl aluminum dichloride, titanium tetrabutoxide and tris-N,N-dimethyl phosphoramide. The importance of the various components of this reaction mixture is evident from the fact that a mixture of ethyl aluminum dichloride and titanium tetrabutoxide produces large amounts of oils and rubbers in a propylene polymerization. However, when the above phosphoramide or other third compound within the scope of this invention is added to the mixture the resulting catalyst composition is highly effective for polymerizing propylene to form a highly crystalline high-tensity, high softening polymer without the formation of oils and rubbers.

The invention is illustrated by the following examples of certain preferred embodiments thereof.

*Example 1*

In a nitrogen-filled dry box 2 grams of catalyst was added to a 500 ml. pressure bottle containing 100 ml. of dry heptane. The catalyst was made up of ethyl aluminum dibromide and titanium tetrabutoxide in a molar ratio of 1:1. The pressure bottle was then attached to a propylene source and the reaction mixture was agitated at 70° C. and under 30 p.s.i. of propylene pressure for 6 hours. No solid polypropylene and little, if any, liquid polymer was formed during this time indicating that under these conditions the catalyst mixture was ineffective for polymerizing propylene to form a solid crystalline product.

*Example 2*

The procedure described in Example 1 was followed using 2 grams of a catalyst made up of ethyl aluminum dichloride, tetradodecyl titanate and tris-N,N-dimethyl phosphoramide, $P(O)[N(CH_3)_2]_3$ in a molar ratio of 1:1:0.5. During the 6-hour period of agitation of the reaction mixture at 70° C. under 30 p.s.i. propylene pressure, there was formed 12.9 grams of highly crystalline polypropylene having a density of 0.921 and an inherent viscosity of 3.44 in tetralin at 145° C. The polymer was readily molded into a hard, clear button having a softening point of 161–165° C.

When the ethyl aluminum dichloride in the above catalyst formulation was replaced by phenyl aluminum dichloride, an equally efficient catalyst was formed, and under similar conditions the use of this catalyst resulted in the production of 15.1 grams of highly crystalline polypropylene. Also, replacement of the tetra dodecyl titanate with vanadium tetraalkoxide resulted in an equally efficient catalyst composition for polymerizing propylene.

*Example 3*

In a nitrogen-filled dry box a 500 ml. pressure bottle was loaded with 100 ml. of dry heptane and 2 grams of a catalyst made up of benzyl aluminum dibromide and zirconium tetrabutoxide in a 1:1 molar ratio. The pressure bottle was then attached to a propylene source and the reaction mixture was agitated at 70° C. and under 30 p.s.i. of propylene pressure for 6 hours. No solid propylene polymer was obtained. However, 60 grams of liquid, low-molecular weight polymers were formed. Analysis by gas chromatography indicated that this product contained propylene dimers, trimers and tetramers.

*Example 4*

The process of Example 3 was followed using a 2-gram catalyst charge containing methyl aluminum dibromide, titanium tetramethoxide and tris-N,N-dimethylphosphoramide in a molar ratio of 1:1:1. A 16.7 gram yield of solid polypropylene was produced. This solid polymer was extracted with dibutyl ether to remove a small quantity of rubbery polypropylene and then extracted with heptane to remove low-molecular weight, crystalline polypropylene. The residual 13.4 grams of polypropylene was highly crystalline: density 0.918, inherent viscosity 2.62 and softening point 162–166° C.

Vanadium alkoxides, zirconium alkoxides, molybdenum alkoxides and chromium alkoxides, when used in place of titanium alkoxides in the above catalyst, results in catalysts that effectively polymerize propylene to solid crystalline polymers.

*Example 5*

Inside a nitrogen-filled dry box a 280 ml. stainless steel autoclave was loaded with 0.75 gram of a catalyst having a 1:1:0.25 molar ratio of ethyl aluminum dichloride, titanium triethoxide and tris-N,N-dimethyl phosphoramide. The autoclave was sealed, placed in a rocker and 100 ml. (51 grams) of propylene was added. Rocking was initiated and the mixture was heated to 85° C. for 4 hours. A yield of 47.3 grams of highly crystalline polypropylene was obtained having a density of 0.92 and an inherent viscosity of 3.84.

Mixed amide esters such as $C_2H_5OP(O)(NR_2)_2$, triethyl phosphate, triethyl phosphite, N,N-dimethylacetamide and adipamide, when used in place of the above phosphoramide produce desirable yields of highly crystalline polypropylene.

*Example 6*

The process of Example 5 was followed using 0.1 gram of catalyst charge containing a 1:2:0.25 molar ratio of ethyl aluminum dibromide, vanadium tetraethoxide and tris-N,N-dimethyl phosphoramide at 85° C. to produce 9.5 grams of highly crystalline polypropylene having a density of 0.919 and an inherent viscosity of 1.48.

*Example 7*

The process of Example 5 was followed using 1.5 grams of catalyst charge containing ethyl aluminum dichloride, titanium tetra-2-ethylhexoxide and tris-N,N-dimethyl phosphoramide in a molar ratio of 1:0.5:0.25 and at a temperature of 55° C. A highly crystalline polypropylene was formed.

Example 8

The process of Example 5 was followed using 3-methyl-1-butene as the monomer at a polymerization temperature of 150° C. A 28-gram yield of highly crystalline poly-3-methyl-1-butene was obtained. Good yields of highly crystalline polymer were also obtained using 4-methyl-1-pentene, 1-butene, 1-pentene and vinyl-cyclohexane, allylbenzene and styrene.

Thus, by means of this invention polyolefins such as polyethylene and polypropylene are readily produced using a catalyst combination which, based on the knowledge of the art, would not be expected to be effective. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

From the detailed disclosure of this invention it is quite apparent that in this polymerization procedure a novel catalyst, not suggested in prior art polymerization procedures, is employed. As a result of the use of this novel catalyst it is possible to produce polymeric hydrocarbons, particularly polypropylene, having properties not heretofore obtainable. For example, polypropylene prepared in the presence of catalyst combinations within the scope of this invention is substantially free of rubbery and oily polymers and thus it is not necessary to subject such polypropylene of this invention to extraction procedures in order to obtain a commercial product. Also polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

Although the invention has been described in considerable detail with reference to certain preferred embodiments thereof, variations and modifications can be effected within the spirit and scope of this invention as described hereinabove and as defined in the appended claims.

I claim:

1. In the polymerization of α-monoolefinic hydrocarbon containing 3 to 10 carbon atoms to form solid, crystalline polymer, the improvement which comprises catalyzing the polymerization with a catalytic mixture consisting essentially of an aluminum dihalide having the formula $R_1AlX_2$ wherein $R_1$ is a hydrocarbon radical containing 1 to 12 carbon atoms and selected from the group consisting of alkyl, aryl and aralkyl and the halogen atoms being selected from the group consisting of chlorine, bromine and iodine, an alkoxide of a transition metal selected from the group consisting of titanium, zirconium, vanadium, chromium and molybdenum and an organophosphorus compound selected from the group consisting of tri-lower alkyl phosphites, tri-lower alkyl phosphates and hexa-lower alkyl phosphoramides, the molar ratio of aluminum dihalide to organophosphorus compound being within the range of 1:1 to 1:0.25.

2. In the polymerization of propylene to form solid, crystalline polymer, the improvement which comprises catalyzing the polymerization with a catalytic mixture consisting essentially of an alkyl aluminum dihalide wherein the alkyl radicals contain 1 to 12 carbon atoms and the halogen atoms are selected from the group consisting of chlorine, bromine and iodine, a titanium alkoxide and an organophosphorus compound selected from the group consisting of tri-lower alkyl phosphites, tri-lower alkyl phosphates and hexa-lower alkyl phosphoramides, the molar ratio of aluminum dihalide to organophosphorus compound being within the range of 1:1 to 1:0.25.

3. In the polymerization of propylene to form solid, crystalline polymer, the improvement which comprises effecting the polymerization in liquid dispersion in an organic liquid and in the presence of a catalytic mixture consisting essentially of a molar ratio of ethyl aluminum dichloride and vanadium tetrabutoxide of 1:0.5 to 1:2 and a molar ratio of ethyl aluminum dichloride and tris-N,N-dimethyl phosphoramide within the range of 1:1 to 1:0.25.

4. In the polymerization of propylene to form solid, crystalline polymer, the improvement which comprises effecting the polymerization in liquid dispersion in an organic liquid and in the presence of a catalytic mixture consisting essentially of a molar ratio of ethyl aluminum dibromide and titanium tetrabutoxide of 1:0.5 to 1:2 and a molar ratio of ethyl aluminum dibromide and tris-N,N-dimethyl phosphoramide within the range of 1:1 to 1:0.25.

5. In the polymerization of propylene to form solid crystalline polymer the improvement which comprises effecting the polymerization in liquid dispersion in an organic liquid and in the presence of a catalytic mixture consisting essentially of a molar ratio of ethyl aluminum dichloride and titanium tetrabutoxide of 1:0.5 to 1:2 and a molar ratio of ethyl aluminum dichloride and tris-N,N-dimethyl phosphoramide within the range of 1:1 to 1:0.25.

6. In the polymerization of propylene to form solid crystalline polymer the improvement which comprises effecting the polymerization in liquid dispersion in an inert organic liquid and in the presence of a catalytic mixture consisting essentially of a molar ratio of ethyl aluminum dichloride and titanium tetraethoxide within the range of 1:0.5 to 1:2 and a molar ratio of ethyl aluminum dichloride to tris-N,N-dimethyl phosphoramide within the range of 1:1 to 1:0.25.

7. In the polymerization of propylene to form solid crystalline polymer the improvement which comprises effecting the polymerization in liquid dispersion in an inert liquid hydrocarbon vehicle and in the presence of a catalytic mixture consisting essentially of a molar ratio of ethyl aluminum dichloride and titanium tetramethoxide of 1:0.5 to 1:2 and a molar ratio of ethyl aluminum dichloride and tris-N,N-dimethyl phosphoramide within the range of 1:1 to 1:0.25.

8. As a composition of matter, a polymerization catalyst consisting essentially of a molar ratio of ethyl aluminum dichloride and titanium tetrabutoxide of 1:0.5 to 1:2 and a molar ratio of ethyl aluminum dichloride and tris-N,N-dimethyl phosphoramide within the range of 1:1 to 1:0.25.

9. As a composition of matter, a polymerization catalyst consisting essentially of a molar ratio of ethyl aluminum dichloride and titanium tetraethoxide within the range of 1:0.5 to 1:2 and a molar ratio of ethyl aluminum dichloride to tris-N,N-dimethyl phosphoramide within the range of 1:1 to 1:0.25.

10. As a composition of matter, a polymerization catalyst consisting essentially of a molar ratio of ethyl aluminum dichloride and titanium tetramethoxide of 1:0.5 to 1:2 and a molar ratio of ethyl aluminum dichloride and tris-N,N-dimethyl phosphoramide within the range of 1:1 to 1:0.25.

11. As a composition of matter, a polymerization catalyst consisting essentially of an aluminum dihalide having the formula $R_1AlX_2$ wherein $R_1$ is a hydrocarbon radical containing 1 to 12 carbon atoms and selected from the group consisting of alkyl, aryl and aralkyl and the halogen atoms being selected from the group consisting of chlorine, bromine and iodine, an alkoxide of a transition metal selected from the group consisting of titanium, zirconium, vanadium, chromium and molybdenum, and an organophosphorus compound selected from the group consisting of tri-lower alkyl phosphites, tri-lower alkyl phosphates and hexa-lower alkyl phosphoramides, the molar ratio of aluminum dihalide to organophosphorus compound being within the range of 1:1 to 1:0.25.

12. As a composition of matter, a polymerization catalyst consisting essentially of an alkyl aluminum dihalide wherein the alkyl radicals contain 1 to 12 carbon atoms and the halogen atoms are selected from the groups consisting of chlorine, bromine and iodine, a titanium alkoxide and an organophosphorus compound selected from the group consisting of tri-lower alkyl phosphites, tri-lower alkyl phosphates and hexa-lower alkyl phosphoramides, the molar ratio of aluminum dihalide to organophosphorus compound being within the range of 1:1 to 1:0.25.

13. As a composition of matter, a polymerization catalyst consisting essentially of a molar ratio of ethyl aluminum dichloride and vanadium tetrabutoxide of 1:0.5 to 1:2 and a molar ratio of ethyl aluminum dichloride and tris-N,N-dimethyl phosphoramide within the range of 1:1 to 1:0.25.

14. As a composition of matter, a polymerization catalyst consisting essentially of a molar ratio of ethyl aluminum dibromide and titanium tetrabutoxide of 1:0.5 to 1:2 and a molar ratio of ethyl aluminum dibromide and tris-N,N-dimethyl phosphoramide within the range of 1:1 to 1:0.25.

References Cited in the file of this patent

UNITED STATES PATENTS

| | | |
|---|---|---|
| 2,824,090 | Edwards et al. | Feb. 18, 1958 |
| 2,833,755 | Coover et al. | May 6, 1958 |
| 2,840,617 | Shokal | June 24, 1958 |
| 2,846,427 | Findlay | Aug. 5, 1958 |
| 2,862,917 | Anderson et al. | Dec. 2, 1958 |
| 2,882,264 | Barnes | Apr. 14, 1959 |